Patented Nov. 30, 1948

2,455,238

UNITED STATES PATENT OFFICE 2,455,238

MANUFACTURE OF HYDROGEN PEROXIDE

Lynn H. Dawsey and Robert R. Umhoefer, Kenmore, and Carl R. Muehlhausser, Tonawanda, N. Y., assignors to Buffalo Electro-Chemical Company, Inc., Tonawanda, N. Y.

No Drawing. Application October 15, 1946, Serial No. 703,286

8 Claims. (Cl. 23—207)

The present invention relates to an improvement in the manufacture of hydrogen peroxide by auto-oxidation processes and more particularly to an improvement in the production of hydrogen peroxide from alkylated anthrahydroquinones in the presence of relatively nonvolatile organic solvents which resist oxidation in the presence of oxygen as well as reduction in the presence of hydrogen.

It has been known for many years that hydrogen peroxide is formed upon oxidation of many organic compounds. The classes of materials which have been found relatively satisfactory for the production of hydrogen peroxide in acceptable quantity are certain types of nitrogen compounds such as the hydrazo and certain special hydroxy groups such as the hydroquinones; it is to the latter reaction that the present invention is directed.

In producing hydrogen peroxide from the hydroquinones and particularly the alkylated hydroquinones or the corresponding tetrahydro alkylated hydroquinones, it has been necessary heretofore in commercial practice to utilize relatively pure oxygen in the presence of combustible solvents and therefore it has been necessary to carry out the oxidation in closed systems to prevent the excessive loss of solvent. It has not been possible to use free air to render the mixture less liable to explosion and fire hazard by reason of volatility of the generally employed solvents, such as benzene, anisole, combustible alcohols and the like. Although the preparation of hydrogen peroxide by auto-oxidation processes appears to be economically favorable, the operational hazards and various disadvantages of employing readily combustible materials in the presence of highly oxidizing substances has relegated the whole process to one of academic consideration.

The production of hydrogen peroxide proceeds in two main stages; 1, the hydrogenation stage where the quinone type hydrocarbon is reduced to the hydroquinone type and 2, the oxidation stage where the hydroquinone type is oxidized to hydrogen peroxide and the quinone type hydrocarbon. The first stage may be characterized by the following specific equation for 2-ethyl anthraquinone:

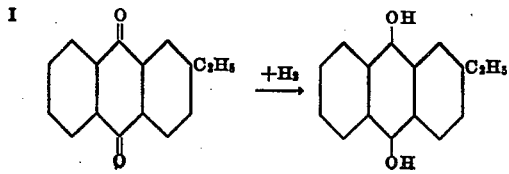

Hydrogen peroxide is produced by the oxidation of the 2-ethyl hydroanthraquinone with oxygen:

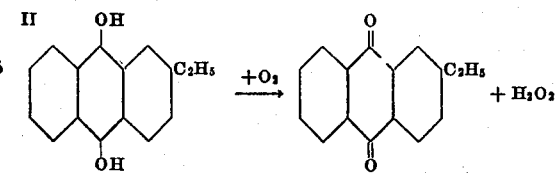

The cycle of the two stages is then repeated after separation of the peroxide as the initial 2-ethyl anthraquinone is regenerated in stage two.

The operation to be successful must be effected in solvents which dissolve appreciable amounts of the anthraquinone as well as the hydroanthraquinone. The reactions of stage 1 and 2 above have heretofore been preferred in the presence of certain alcohols mixed with benzene to obtain requisite solubility of both the reduced and oxidized forms to give significant yields of hydrogen peroxide. Furthermore, the prior art required the employment of oxygen gas to obtain satisfactory conversion rates to hydrogen peroxide, thus further magnifying the explosive hazard of the whole procedure.

It is an object of the present invention to supply a class of solvents any single member of which possesses the requisite solvent power for the quinone as well as the hydroquinone and in which both reduction and oxidation can be carried out at relatively high solubilities of both forms of the working intermediate.

It is also an object of the invention to provide a solvent in which the quinone-hydroquinone reaction may be carried out with a minimum of chemical loss due to direct oxidation of the solvent and with a minimum of physical loss due to evaporation.

It is also an object of the present invention to produce hydrogen peroxide from quinone type materials without the attendant explosion hazard heretofore present.

It is a further object of the invention to provide an operating procedure for producing hydrogen peroxide from alkylated anthrahydroquinones or the tetrahydro alkylated anthraquinones, wherein the oxidation may be produced by the employment of air, and the hydrogen peroxide produced simultaneously therewith, is formed in the presence of materials which are not readily volatile or combustible.

In accordance with the present invention, an organic solvent having a very low vapor pressure and which introduces no serious fire or explosion hazard is employed as the vehicle in which the quinone-hydroquinone reaction is effected, and in general a solvent which possesses a relatively high boiling point or a relatively low melting solvent, or a mixture of such materials.

The solvents discovered as ideally suitable dissolve about 10% of the alkylated anthraquinone and possess a relatively unchanged dissolving power for the hydroanthraquinone, thus making possible the employment of a single solvent rather than a mixture of solvents in the cycle, that is, in both the reduction stage of the quinone compound to the hydroquinone and the oxidation stage of the hydroquinone to hydrogen peroxide with the reformation of the initial quinone compound.

In addition, the solvent preferably possesses a melting point of below about 15° C. and a boiling point of above about 300° C. It is also extremely desirable that the vapor pressure at room temperature of the solvent be below about 0.01 mm. of mercury and a viscosity of below 10 centipoises and possess practically a mutual insolubility with water. Although the solvent may be a single organic material, it is obvious that mixtures are applicable. The specific gravity of the ultimate solvent employed should be below about 0.98 or above about 1.12 for easy extraction of 100 volume $H_2O_2$. It has been found, in accordance with the present invention, that esters of organic acids act as relatively good solvents for the alkylated anthraquinones and their corresponding hydrogenation products.

In contrast to prior operations where mixed solvents had to be employed, one component of which was a solvent for the hydroquinone, another component being a solvent for the quinone, esters of organic acids generally appear to possess solubility for both the reduced and the oxidized form of the intermediate. The esters selected must also possess the other characteristics mentioned, and it has been found that esters of sebacic acid possess particular efficacy as solvents in which the complete operation, both of reduction to hydroquinone form and oxidation to quinone form, can be carried out. The esters which possess particular application are dimethyl sebacate, diethyl sebacate, dibutyl sebacate and dibenzyl sebacate, dicyclohexyl sebacate, di-isopropyl sebacate, or mixtures of these esters.

Although esters of sebacic acid are the preferred solvents, esters of other dibasic organic acids have been found suitable as solvents for the production of hydrogen peroxide from hydroquinones. Thus esters of succinic acid, such as di-N-hexyl succinate, di-p-methylcyclohexyl succinate, and di-2-ethyl-hexyl succinate among others possess the necessary property. So also esters of adipic acid such as di-n-hexyl adipate and di-methyl-amyl adipate are suitable solvents.

In general, the solvent should be an ester of a dibasic organic acid, the molecular structure of the ester containing 12 to 26 carbon atoms, containing two ester groups and made from an aliphatic or aryl-aliphatic acid and an aliphatic or aryl-aliphatic alcohol. The preferred esters, dibutyl sebacate, di-n-hexyl succinate and di-n-hexyl adipate contain 16 to 20 carbon atoms.

The following specific examples are purely illustrative of the invention and are not to be deemed limitative thereof as it will be understood that there are many variations of the invention possible within the scope of the invention as outlined and claimed herein.

Example 1

260 g. of ethylanthraquinone was dissolved at slightly elevated temperature in dimethyl sebacate to produce 2 l. of a solution about saturated with the quinone at room temperature and having a specific gravity of 1.02. 10 cc. of dimethyl sebacate completely dissolve the following amounts of 2-ethylanthraquinone at the temperatures indicated: 20° C.—1.0 g.; 25° C.—1.15 g.; 40° C.—2. g.; 52° C.—3. g.

29.7 l. of hydrogen gas measured in a wet meter at 29° C. and 765 mm. pressure was passed into this 2 l. of solution in the regular way in the presence of nickel catalyst until the color had gone through the brown quinhydrone stage and finally into the yellow-green fluorescent hydroquinone stage. The hydrogen uptake corresponded to 105% of the original quantity of quinone present. The time of the hydrogenation was about 100 minutes with 5% to 10% catalyst based upon amount of quinone.

The reduced solution was filtered into a 4 l. capacity conical oxidizing vessel which was fitted with stirrer and air bubbled therethrough at atmospheric pressure at a rate of 6 liters per minute for a period of 4 to 5 hours until the solution turned yellow indicating all of the hydroquinones had been oxidized back into the quinones. The hydrogen peroxide which was extracted with 5 successive washings of water and sodium sulfate solution amounted to 35.9 g., a yield of 96% based upon the quinone content of the organic solution, or a yield of 91% based upon hydrogen uptake.

On recycling 6 times with repetition of these operations, the acid value of the original solution remained unchanged indicating no chemical deterioration of the solvent; also the original volume was the same showing no evaporation loss of the solvent.

Example 2

174 g. of ethylanthraquinone was dissolved at elevated temperature in dibutyl sebacate to give 2 l. of a slightly supersaturated solution of specific gravity of 0.95 at room temperature. 10 cc. of dibutyl sebacate completely dissolve the following amounts of the quinone: 14° C.—0.5 g.; 27° C.—0.7 g.; 36.5° C.—0.9 g.

Hydrogen gas measured in a wet meter at 25° C. and 761 mm. pressure was passed into this 2 l. of solution, as in Example 1, until the color had turned dark brown indicating presence of the quinhydrone stage. The hydrogen uptake corresponded to approximately 85% hydrogenation of the quinone. The brown reduced solution was filtered into the oxidizing vessel and aerated for 3 hours until the original yellow color returned. The organic solution was successively washed with water with the extraction of 19.0 g. of hydrogen peroxide.

The first extraction made with a small amount of water, contained 0.331 g./cc. showing that hydrogen peroxide of better than 100 volume strength was obtainable directly. After extraction the working solution was dried, purified and circulated back to the hydrogenator to begin the next cycle. The sebacate solution was alternately subsequently reduced and oxidized for 8 complete cycles in this fashion with varying degrees of hydrogenation ranging between 60% and 85% with recovery of the corresponding amounts of peroxide formed each cycle. At the end of the eighth cycle the acid value of the working solution was unchanged and the volume was unchanged, indicated no deterioration or loss of this solvent.

The degress of overhydrogenation of the organic intermediate encountered during the recycling did not interfere with the proper functioning of the solvent.

The esters of the dibasic organic acids mentioned, and particularly dibutyl sebacate, provide an organic solvent for both the quinone and hydroquinone type of the alkylated anthraquinones and, therefore, one in which the complete operation of reduction and oxidation to hydrogen peroxide may be preferred. Due to the low volatility of these solvents, there is no explosion hazard. More importantly, air may be employed as the oxidizing agent in contrast to the requirement of oxygen in the prior art, thereby effecting an important economic saving.

The substantial insolubility of the listed esters in water insures a minimum of loss of solvent during the extraction of the peroxide.

From the foregoing, it will be seen that the present invention provides a class of solvents permitting the production by auto-oxidation of hydrogen peroxide from the alkylated anthraquinones or the tetrahydro quinones by the employment of air as the oxidizing agent with excellent yields of hydrogen peroxide.

What is claimed is:

1. In the production of hydrogen peroxide by first hydrogenating an alkylated anthraquinone and then oxidizing the resulting hydroquinones with the formation of hydrogen peroxide and regeneration of the quinones, the improvement which comprises employing dibutyl sebacate as a solvent in which to carry out the reactions.

2. In the production of hydrogen peroxide by first hydrogenating an alkylated anthraquinone and then oxidizing the resulting hydroquinones with the formation of hydrogen peroxide and regeneration of the quinones, the improvement which comprises employing an ester of the sebacic acid as a solvent in which to carry out the reactions.

3. In the production of hydrogen peroxide by first hydrogenating an alkylated anthraquinone and then oxidizing the resulting hydroquinones with the formation of hydrogen peroxide and regeneration of the quinones, the improvement which comprises employing di-n-hexyl succinate as a solvent in which to carry out the reactions.

4. In the production of hydrogen peroxide by first hydrogenating an alkylated anthraquinone and then oxidizing the resulting hydroquinones with the formation of hydrogen peroxide and regeneration of the quinones, the improvement which comprises employing an ester of succinic acid as a solvent in which to carry out the reactions.

5. In the production of hydrogen peroxide by first hydrogenating an alkylated anthraquinone and then oxidizing the resulting hydroquinones with the formation of hydrogen peroxide and regeneration of the quinones, the improvement which comprises employing di-n-hexyl adipate as a solvent in which to carry out the reactions.

6. In the production of hydrogen peroxide by first hydrogenating an alkylated anthraquinone and then oxidiing the resulting hydroquinones with the formation of hydrogen peroxide and regeneration of the quinones, the improvement which comprises employing an ester of adipic acid as a solvent in which to carry out the reactions.

7. In the production of hydrogen peroxide by first hydrogenating an alkylated anthraquinone and then oxidizing the resulting hydroquinones with the formation of hydrogen peroxide and regeneration of the quinones, the improvement which comprises employing an ester of a dibasic organic acid, said ester containing 16 to 20 carbon atoms, as a solvent in which to carry out the reactions.

8. In the production of hydrogen peroxide by first hydrogenating an alkylated anthraquinone and then oxidizing the resulting hydroquinones with the formation of hydrogen peroxide and regeneration of the quinones, the improvement which comprises employing an ester of a dibasic organic acid, said ester containing 12 to 26 carbon atoms, as a solvent in which to carry out the reactions.

LYNN H. DAWSEY.
ROBERT R. UMHOEFER.
CARL R. MUELHAUSSER.

No references cited.